May 4, 1965 W. R. LINDSAY 3,181,302
PIPE SPLITTER AND SPREADER
Filed Aug. 28, 1959 4 Sheets-Sheet 1
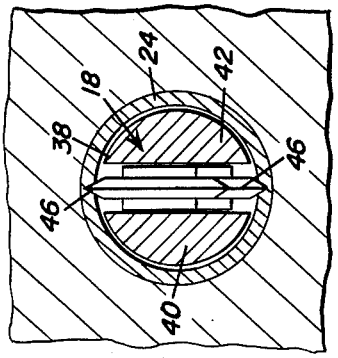
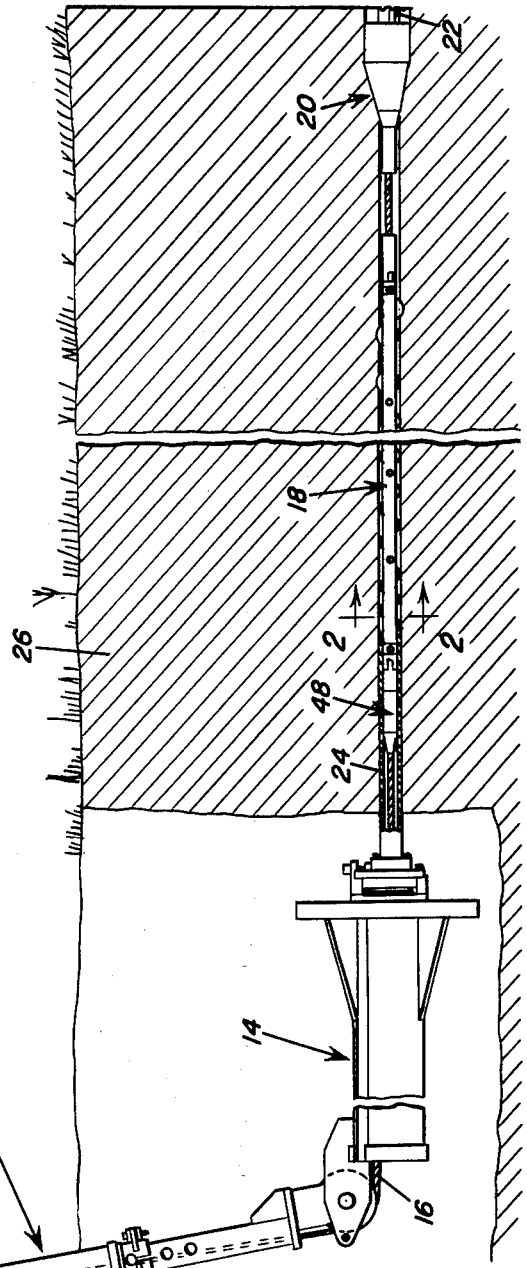
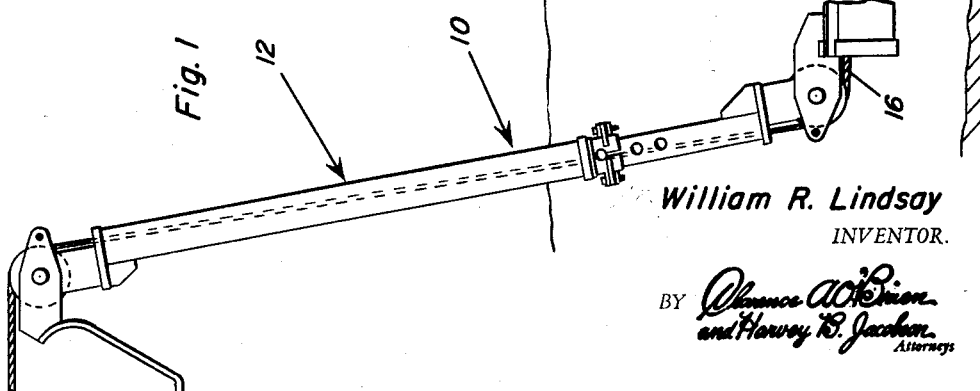
William R. Lindsay
INVENTOR.

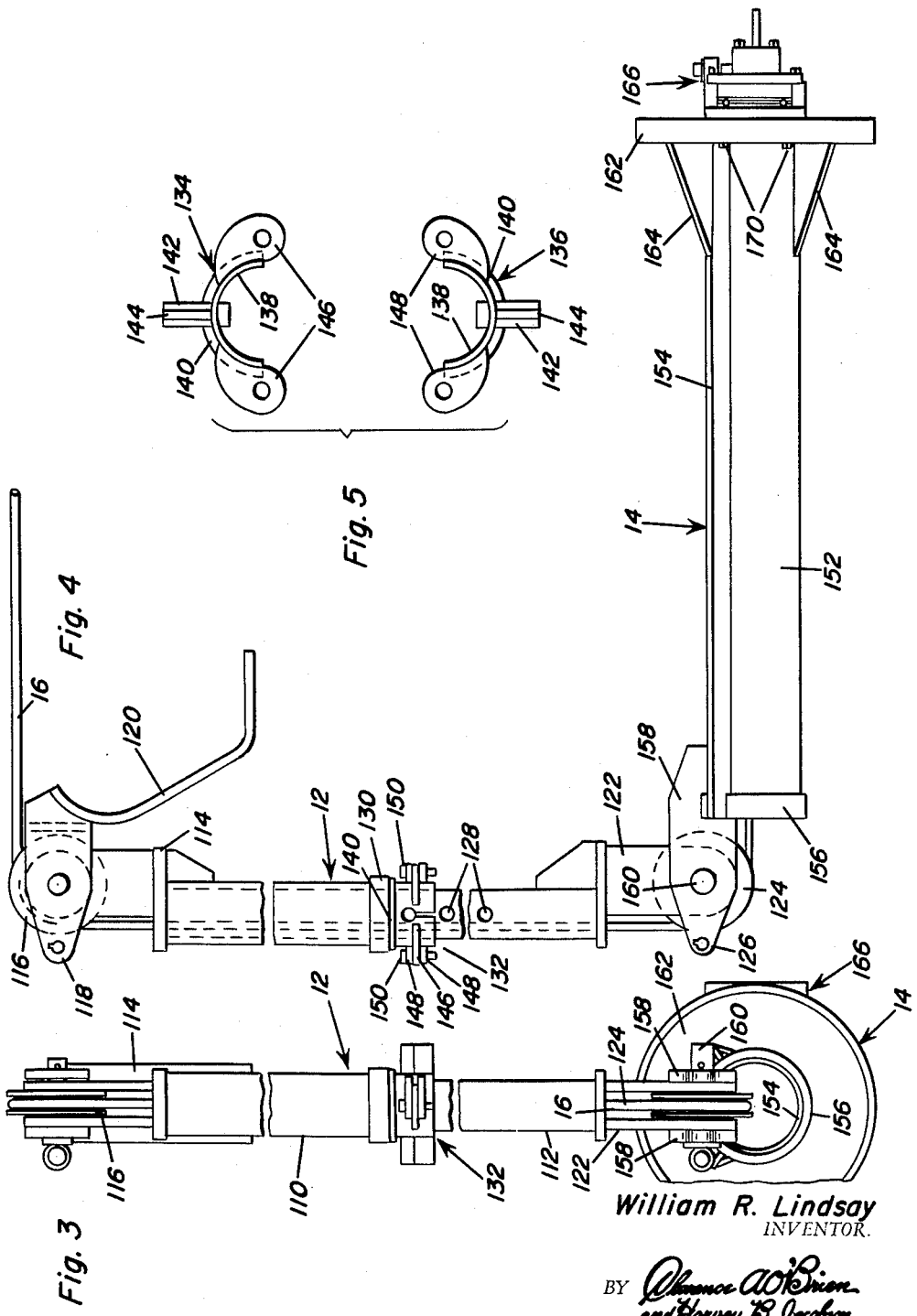

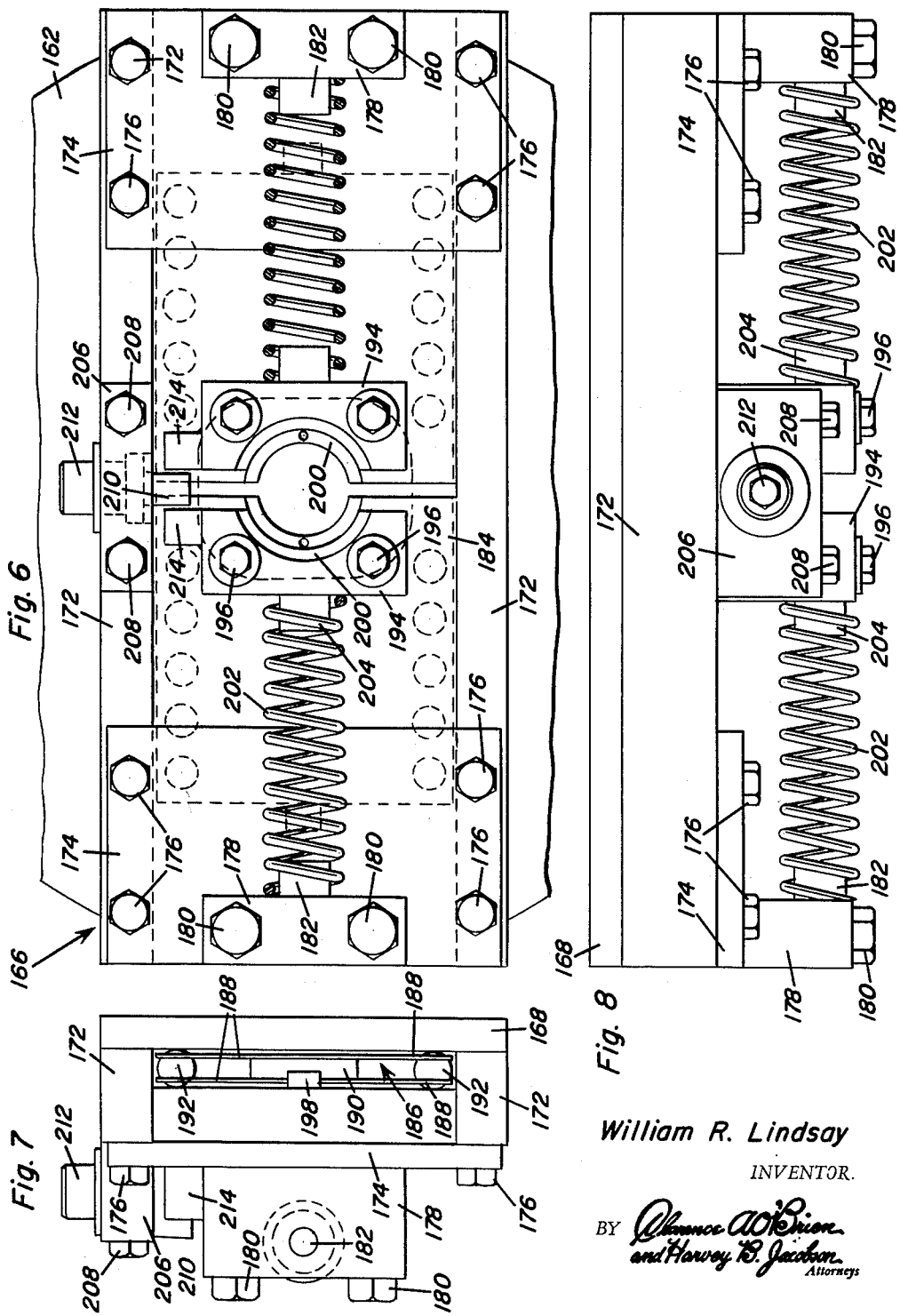

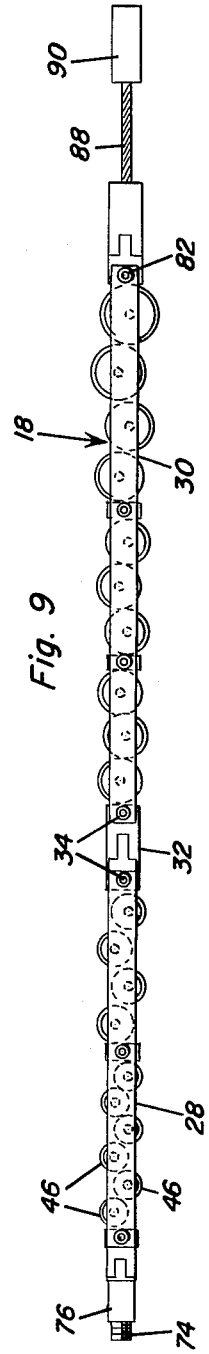

United States Patent Office 3,181,302
Patented May 4, 1965

3,181,302
PIPE SPLITTER AND SPREADER
William R. Lindsay, 241 Dempsey St., Madisonville, Ky.
Filed Aug. 28, 1959, Ser. No. 836,650
3 Claims. (Cl. 61—72.7)

This invention relates in gneral to new and useful improvements in tools for use in conjunction with underground pipes, and more specifically relates to an improved pipe splitter and spreader.

There are many instances where existing pipes must be replaced, primarily due to corrosion of the pipe. While ordinarily the pipe is removed by excavation and a new pipe laid in place thereof, there are many instances where it is undesirable to disturb the existing ground. An example of these is a roadway with a pipe extending therebeneath.

The present invention proposes to leave the existing pipe under the ground and to position a new pipe in the exact location of the existing pipe, the invention utilizing the existing pipe as a guide and locating means for the new pipe.

It is an object of the invention to provide a mechanism for replacing existing pipes with new pipes, the mechanism including means for slitting and spreading the existing pipe and then pulling a new pipe through the spread apart halves of the existing pipe, whereby the new pipe occupies the position of the existing pipe.

Another object of the invention is to provide a mechanism for splitting and spreading an existing pipe underground to facilitate the installing of a new pipe in the same location as the existing pipe, the mechanism including an elongated cutter which may be drawn through the existing pipe and which will split the existing pipe lengthwise into two halves, and a spreader following the cutter, which spreader will spread apart the two halves of the existing pipe to provide sufficient space for a new pipe to be pulled between the two halves of the existing pipe.

Another object of the invention is to provide a mechanism which may be operated at ground level to split apart an existing pipe and to pull through the space occupied previously by the existing pipe a new pipe, the mechanism including a cable and a tool string, the cable having associated therewith an upstanding cable guide which is provided with pulleys at the opposite ends thereof to facilitate the change in direction of the cable first from a generally horizontal direction to a vertical direction, and then from the vertical direction to the horizontal again so that the machine may be operated through a ditch at one end of the pipe to be replaced.

A further object of the invention is to provide a mechanism for splitting apart and spreading the halves of an existing pipe, and replacing the existing pipe with a new pipe passing between the halves of the existing pipe, the mechanism including a ground tube against which one end of the existing pipe bears to prevent the movement thereof during the splitting and spreading thereof, the ground pipe being of a size and a length to receive the cutter and spreader of the mechanism.

Still another object of the invention is to provide a pipe retaining mechanism for retaining a pipe during the splitting and spreading thereof, the pipe retaining mechanism including a seat for one end of the pipe to be split and spread, the seat being formed by a pair of jaws which are resiliently mounted and which may be spread apart to permit the passing of the cutter and spreader therebetween at the end of a cutting and spreading operation.

A still further object of the invention is to provide a novel method of installing new pipes in place of existing pipes, the method including the steps of first slitting the existing pipe to form two longitudinally extending halves, and then spreading apart the halves a distance sufficiently to permit the passage of a new pipe, after which a new pipe is drawn through the existing pipe to occupy the original position of the existing pipe.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a vertical sectional view taken through the ground and shows an existing pipe underground being replaced by a new pipe, an intermediate portion of the existing pipe being broken away and a major portion of the existing pipe being shown in section to illustrate the details of the cutter and spreader;

FIGURE 2 is an enlarged fragmentary sectional view taken substantially upon the plane indicated by the section line 2—2 of FIGURE 1 and shows the specific details of the pipe cutter and the relationship thereof with respect to the existing pipe which is being cut;

FIGURE 3 is an enlarged elevational view taken from the left side of FIGURE 1 and shows generally the details of the cable guide tube and the ground tube, an intermediate portion of each of the cable guide tube lower sections being broken away;

FIGURE 4 is an enlarged fragmentary elevational view showing the cable guide tube and the ground tube, the support for the cable guide tube being reverse from that illustrated in FIGURE 1, an intermediate portion of the cable guide tube sections being broken away;

FIGURE 5 is an enlarged exploded plan view of the anchors adjustably carried by the cable guide tube lower section to facilitate the adjustment of the length of the cable guide tube;

FIGURE 6 is an enlarged fragmentary elevational view of the pipe retaining end of the ground tube and shows the specific details of a construction of a pipe retainer carried thereby;

FIGURE 7 is a side elevational view of the pipe retainer of FIGURE 6 and shows further the details thereof;

FIGURE 8 is an enlarged plan view of the pipe retainer of FIGURE 6 and shows still further the details thereof;

FIGURE 9 is an enlarged elevational view of the pipe cutter per se and shows the specific details thereof including the arrangement of the cutter disks thereof;

FIGURE 10 is a plan view of the pipe cutter per se;

FIGURE 11 is an enlarged fragmentary elevational view with parts broken away and shown in section and shows the details of the pipe spreader and the relationship thereof with respect to the pipe cutter;

FIGURE 12 is an enlarged sectional view taken through a swivel fitting for attaching the cable to the pipe cutter and shows the specific details of the fitting; and FIGURE 13 is an end view of the swivel fitting and shows further the details thereof.

Referring now to the drawings in detail, it will be seen that there is illustrated in FIGURE 1 the over-all details of the mechanism which is the subject of this invention, the mechanism being generally referred to by the numeral 10. The mechanism 10 includes a cable guide tube assembly, generally referred to by the numeral 12 which is disposed upright and which will be attached to a truck or other support structure. A ground tube assembly, generally referred to by the numeral 14, is disposed at the lower end of the guide tube assembly 12. A cable 16 passes downwardly through the cable guide tube assembly 12 and horizontally through the ground tube assembly 14. A pipe cutter, generally referred to by the numeral 18, is attached to one end of the cable 16. A spreader assembly, generally referred to by the numeral 20 is connected to the cutter 18 and is pulled therebehind in trailing relation.

The mechanism 10 is intended for inserting a new pipe, referred to by the numeral 22, in the place of an existing pipe, referred to by the numeral 24. The existing pipe 24 is disposed beneath the ground 26 and it is desired to replace the pipe 24 without disturbing the surface of the ground 26.

In accordance with this invention, it is proposed to replace the existing pipe 24 with a new pipe 22 by first longitudnally splitting the existing pipe 24 into two halves, and then spreading apart the two halves of the existing pipe to provide sufficient room to pull through the new pipe 22. It is also proposed to carry this out in a single operation. With the purpose and function of the invention so understood, the specific details of the invention will be more readily understandable.

Reference is first made to FIGURES 9 and 10 wherein the specific details of the pipe cutter 18 are illustrated. The pipe cutter 18 is formed in two sections, a leading section 28 and a trailing section 30. The pipe cutter sections 28 and 30 are connected together for both horizontal and vertical pivotal movement by a fitting 32. The fitting 32 includes a pair of horizontal pivot pins 34 and a vertical pivot pin 36.

Each of the sections 28 and 30 includes an elongated support bar 38. As is illustrated in FIGURE 2 in particular, the support bar 38 is formed of a pair of halves 40, 42 which are retained in spaced relation by spacer blocks 44 disposed at spaced intervals. It is to be noted that the outer surfaces of the support bar sections 40, 42 correspond generally to the internal surface configuration of the existing pipe 24 so that the existing pipe 24 functions as a guide for the cutter assembly 18.

A plurality of cutter disks 46 are carried by each of the cutter sections. The disks 46 alternately project upwardly and downwardly from their respective support bar 38. It is also to be noted that the cutter disks 46 increase in diameter from the leading end of the cutter assembly 18 to the trailing end thereof, and the amount which the individual cutter disk projects from its associated support bar 38 increases from the leading end to the trailing end of the cutter assembly. In this manner, as the cutter assembly 18 is drawn through the existing pipe 24, it progressively cuts the pipe 24 until the pipe is split into two longitudinal halves.

In order to assure the proper positioning of the cutter assembly 18 and to prevent the cable 16 from having any twisting effects thereon, the leading end of the cutter assembly 18 is provided with a swivel fitting, generally referred to by the numeral 48. The details of the swivel fitting 48 are best illustrated in FIGURES 12 and 13.

The swivel fitting 48 includes a tubular member 50 having an end wall 52 at one end thereof. The end wall 52 is provided with a longitudinal bore 54. An externally threaded fitting 56 is disposed exteriorly of the fitting 50 adjacent the end wall 54. A shaft 58 extends into and is threadedly connected to the externally threaded fitting 56 as at 60. The shaft 58 is provided with an enlarged head 62 which corresponds in cross-section generally to the internal diameter of the fitting 50. The head 62 is spaced from the end wall 52 by suitable bearings 64.

In order that the head 62 may be held against rotation to facilitate the removal of the fitting 60 from the shaft 58, the head 62 is provided with a transverse bore 66 which may be aligned with a transverse bore 68 of the fitting 50. Also, in order to facilitate the rotation or the holding of the head 62 and the shaft 58, the end of the head 62 facing out of the fitting 50 is provided with bores 70 for a spinner wrench.

The rear portion of the fitting 50 is internally threaded as at 72 to receive a threaded end 74 of a fitting 76 at the leading end of the cutter assembly 18. The fitting 76 is pivotally connected to the remainder of the cutter assembly 18 by a vertical pivot pin 78.

Reference is now made to FIGURE 11 in particular wherein it is shown that the rear end of the cutter assembly 18 terminates in a fitting 80 which is pivotally connected to the cutter assembly 18 by means of a horizontal pivot pin 82. A connecting fitting 84 is pivotally connected to the fitting 80 by means of a vertical pivot pin 86. The connecting fitting 86 has secured thereto a short length of cable 88. A second cable connector 90, which is similar to the fitting or cable connector 84, is connected to the trailing end of the cable section 88. The cable connector 90 has a trailing end portion which is tubular and is internally threaded as at 92.

The spreader 20 includes a generally frusto-conical intermediate portion 94 which terminates in a trailing cylindrical portion 96. The forward end of the spreader 20 is solid and is also generally frusto-conical, the forward portion of the spreader 20 being referred to by the numeral 98. The forward portion 98 has a bore 100 therethrough through which a shaft 102 extends. The shaft 102 is threaded into the cable connector 90 and is provided with a head 104 which engages the rear part of the portion 98. A pipe coupling 106 is welded to the head 104, as at 108. The new pipe 22 is threadedly connected to the pipe coupling 106.

In the operation of the invention, as stated above, the cutter 18 is drawn through the existing pipe 24 so as to split the existing pipe 24 into longitudinal sections. The spreader 20, is then pulled through the existing pipe 24 to spread apart the split halves thereof. The new pipe 22 is pulled through the spread apart halves 70 of the existing pipe 24 following the spreader 20. Since the existing pipe 24 is disposed below the level of the ground, and since it is desirable that the drive mechanism for the invention be disposed above the ground level, it is necessary that there be provided other mechanisms for controlling the movement of the cable 16. These mechanisms include the previously mentioned cable guide tube assembly 12 and the ground tube assembly 14.

As is best illustrated in FIGURES 3 and 4, the cable guide tube assembly 12 is formed in sections, including an upper section 110 and a lower section 112. The upper end of the upper section 110 is provided with a support fitting 114 which, in turn, supports a pulley or sheave 116. The support fitting 114 also includes a removable pin 118 which normally prevents the removal of the cable 16 off of the sheave 116. The support fitting 114 also includes a mounting bracket 120 which may be suitably connected to a platform which will, in turn, support a winch (not shown). The platform will preferably be in the form of a truck (not shown).

The lower end of the lower tube section 112 is also provided with a support fitting 122. The support fitting 122 supports a pulley or sheave 124. The supporting fitting 122 also carries a pin 126 which prevents the movement of the cable 16 off of the pulleys 124.

It is to be noted that the pulleys 116 and 124 are disposed out of alignment so that the cable 16 passes through the tube sections 110 and 112. In this manner, the cable 16 is protected for a major part of its operating length.

In order to vary the length of the cable guide tube assembly 12 to compensate for variations in depth of the existing pipe 24, the lower tube section 112 is telescoped within the upper tube section 110. Also, the lower tube section 112 is provided with a plurality of vertically spaced horizontal bores 128. The lower end of the upper tube 110 is provided with a collar 130. A removal collar unit, generally referred to by the numeral 132, is carried by the lower tube section 112 and engages the underside of the collar 130 to limit the telescoping of the tube sections 110 and 112.

The collar unit 132 includes a pair of similar collar elements 134 and 136. The collar element 134 includes a semicylindrical collar member 138 which is provided at the upper edge thereof with a projecting annular flange 140. A radial pin 142 extends through the collar member 138. The pin 142 is reinforced by a gusset 144. A connecting ear 146 projects from each free end of the collar element 138.

The collar section 136 differs from the collar section 134 only in that it is provided with a pair of spaced apart ears 148 between which the ears 146 of the collar section 134 are received. Otherwise, the collar section 136 includes a semi-cylindrical collar element 138, the pin or shaft 142 which is provided with a reinforcing gusset 144. The collar section 136 also includes the annular flange 140.

When it is desired to adjustably position the tube section 112 with respect to the tube section 110, the proper aperture 128 is determined. The shafts or pins 142 of the collar sections 134, 136 are inserted in the proper apertures 128. The collar sections 134, 136 are then locked together by pins 150 which are passed through the ears 146, 148 which are disposed in overlapping relation. The flanges 140 then abut the underside of the collar 130 to limit the further telescoping of the tube sections 110 and 112. The pull on the cable 16 passed around the sheaves or pulleys 116, 124 urges the tube sections 110 and 112 into telescoping relation.

The ground tube assembly 14 includes an elongated tube 152 which is split so as to have an upwardly open longitudinal slit defined by a pair of upstanding flanges 154. The leading end of the tube 152 is provided with a collar 156 and a fitting 158 is connected to the flanges 154 and the collar 156. The fitting 158 is a support fitting and is pivotally connected to the support fitting 122 by the pivot pin or axle for the sheave 124. It is to be noted that the relationship between the tube 152 and the sheave 124 is such that the cable 16 passing around the sheave 124 is generally centered with the center of the tube 152.

The trailing end of the tube 152 is provided with an enlarged circular plate 162. The plate 162 is reinforced relative to the tube 152 by a plurality of circumferentially spaced gussets 164. A pipe retainer, generally referred to by the numeral 166 is secured to the plate 162.

The details of the pipe retainer 166 are best illustrated in FIGURES 6, 7 and 8. The pipe retainer 166 includes a mounting plate 168 which is elongated and is rectangular in elevation. The mounting plate 168 is secured to the plate 162 by bolts which pass through the plate 162. A pair of guide rails 172 extend the full length of the plate 168 along the upper and lower edges thereof. The plates 174 are disposed rearwardly of the guide rails 172 and are secured to the plate 168 by bolts 176. The bolts 176 also pass through the guide rails 172 and serve to secure the guide rails 172 to the plate 168.

A pair of stop members 178 is secured to the rear faces of the plates 174 at the outer edges thereof. The stop plates 178 are secured in place by fasteners 180. The stop plates 178 are provided with opposed pins 182, the purpose of which will be described in detail hereinafter.

A pair of slide plates 184 are disposed rearwardly of the plates 174 and between the guide rails 172. Disposed rearwardly of each of the slide plates 184 is a bearing assembly, generally referred to by the numeral 186. Each bearing assembly 186 includes a pair of spaced parallel bearing retaining plates 188 which are maintained in spaced relation by a centrally located spacer 190 and which are provided adjacent the upper and lower edges thereof with a series of spherical bearing members 192. The bearing members 192 are disposed between the plates 188 and are free to rotate therebetween. It is to be noted that the bearing members 192 engage both the forward surface of the slide plates 184 and the rear surface of the plate 168.

Secured to the rear face of each of the side plates 184, adjacent the inner edge thereof, is a jaw member 194. Each jaw member 194 is secured to its respective slide plate 184 by fasteners 196. The fasteners 196 extend through their respective slide plates 184 and engage the inner edges of the plates 188 of the bearing assembly 186 associated therewith. A second stop member 198 projects from the individual slide plate 184 remote from the fasteners 196 and engages the other edge of one of the plates 188. In this manner the individual bearing assembly 186 is connected to the individual slide plate 184 for movement therewith.

The jaw members 194 are each provided with a tapered pipe seat 200. The tapered pipe seats 200 combine to form a socket for receiving the end of the existing pipe 24.

Since the jaw members 194 and their associated slide plates 184 are free to move apart, in order to resiliently prevent this, there are provided springs 202 which extend between each of the jaw members 194 and an associated one of the stop locks 174. Opposite ends of the springs 202, which springs are coil springs, are disposed over the pins 182 and pins 204 carried by the jaw members 194.

The upper guide rail 172 has a rearwardly extending mounting block 206 secured thereto by fasteners 208. A spacer block 210 is mounted in depending relation from the mounting block 206 by means of a rotatable support 212. The spacer block 210 is disposed between a pair of ears 214 projecting upwardly from the jaw members 194. The spacer block 210 normally retains the jaw members 194 in position for receiving the end of the pipe 24. After the jaw members 194 are spread apart in a manner to be described in detail hereinafter, the spacer block 210 may be rotated to retain the jaw members 194 in spaced apart relation to facilitate the removal of parts therethrough.

In the operation of the invention, the cable guide tube assembly 112 is adjusted in length so that the ground tube assembly 14 is aligned with the existing pipe 24. The ground tube assembly 14 is then engaged with the exposed end of the existing pipe 24 so that the existing pipe 24 projects into the pipe receiving socket defined by the pipe seat 200. Prior to this, the cable 16 has been led through the pipe 24 from left to right, as viewed in FIGURE 1. The cutter 18, the spreader 20 and the new pipe 22 are then attached to the cable 16.

Once the machine 10 has been so assembled, the cable 16 is drawn in to pull the cutter assembly 18 through the existing pipe 24. After the cutter assembly 18 passes through the existing pipe 24, splitting the existing pipe 24, it will engage the tapered pipe seats 200 and slightly spread apart the jaw members 194, should it be necessary. However, normally the pipe cutter assembly 18 will pass between the jaw members 194 because of the relationship of size between the elements of the cutter element 18 and the existing pipe 24. As the spreader 20 passes out of the left end of the existing pipe 24, it too will engage the jaw members 194 and will definitely spread the jaw members 194 apart as it passes into the ground tube assembly 14. After the new pipe 22 has been drawn through the existing pipe 24, it may be uncoupled from the pipe coupling 106 and the machine 10 removed. The spacer block 210 may be positioned to facilitate the removal of the spreader and the cutter assembly 18 from the ground tube 14.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. Apparatus for replacing a pipe occupying an underground passageway through which a substantially horizontal axis extends comprising, a pipe splitting cutter adapted to be drawn through said passageway in one direction, a pipe spreader connected to said cutter rearwardly thereof in said one direction, said spreader being dimensioned transversely larger than the largest transverse dimension of the cutter to enlarge said passageway in diameter, a pipe connector fitting connected to the pipe spreader rearwardly thereof, operating means connected to said cutter and extending forwardly therefrom for projecting out of the passageway and rendering the cutter operative in response to movement thereof through the passageway, pipe holding means through which said operating means extends forwardly from said cutter, said pipe holding means including an elongated ground tube disposed coaxially of said cutter and said spreader for spaced alignment with said passageway and having an internal passage dimensionally exceeding the cutter and the pipe spreader in transverse dimension, and means forming a pipe receiving seat on a rear end of the ground tube, a guide tube pivotally connected to the ground tube at the forward end thereof, said seat being formed by a pair of jaw halves, and means resiliently mounting said jaw halves on the ground tube for movement apart permitting the passage of the cutter and said spreader through the ground tube.

2. Apparatus for replacing a pipe occupying an underground passageway through which a substantially horizontal axis extends comprising a pipe splitting cutter adapted to be drawn through said passageway in one direction, a pipe spreader connected to said cutter rearwardly thereof in said one direction, said spreader being dimensioned transversely larger than the largest transverse dimension of the cutter to enlarge said passageway in diameter, a pipe connector fitting connected to the pipe spreader rearwardly thereof, operating means connected to said cutter and extending forwardly therefrom for projecting out of the passageway and sequentially drawing said cutter and spreader through the passageway, pipe holding means through which said operating means extends forwardly from the cutter, said pipe holding means including an elongated ground tube disposed coaxially of said cutter and said spreader for spaced alignment with said passageway and having an internal passage dimensionally exceeding the cutter and the pipe spreader in transverse dimension, and means forming a pipe receiving seat on the rear end of said ground tube adapted to resist axial thrust applied thereto by a pipe within the passageway, said cutter including an elongated support bar and a plurality of cutter disks projecting from said support bar in opposite directions relative to the horizontal axis.

3. Apparatus for installing a new pipe section in a covered underground passageway occupied by an existing pipe section comprising tension cable means, guide means having a longitudinal axis and through which guide means the cable means extends rearwardly thereof for entry into the passageway, a splitter movable through said guide means along said longitudinal axis thereof, means connecting the cable means to the splitter for transmitting only axial thrust thereto along said longitudinal axis to impart movement to the splitter in a forward direction parallel only to a cutting plane containing said longitudinal axis, said splitter having cutter means adapted to split the existing pipe section along said cutting plane and extending transversely from said longitudinal axis by an increasing amount in the rearward direction to define the transverse dimensions of the splitter and thereby progressively split the existing pipe section, a spreader adapted to be connected to the new pipe, said spreader having connector means connecting the spreader to the splitter rearwardly along said longitudinal axis for movement therewith through the guide means, and thrust resisting means mounted on the guide means permitting passage of the splitter and spreader through the guide means and having pipe engaging means for engaging the existing pipe section to prevent axial displacement thereof from the passageway when the pipe section is being split by the cutter means.

References Cited by the Examiner
UNITED STATES PATENTS

| | | | |
|---|---|---|---|
| 867,270 | 10/07 | Himble | 111—5 |
| 1,112,894 | 10/14 | Clark | 111—5 |
| 1,790,032 | 1/31 | Visser | 111—5 |
| 1,792,855 | 2/31 | McRae | 111—5 |
| 1,808,974 | 6/31 | Wilkens | 111—5 |
| 2,532,504 | 12/50 | Lapsley. | |
| 2,765,724 | 10/56 | Kinsinger | 61—72.7 X |
| 2,876,717 | 3/59 | Tetyak | 111—5 |

FOREIGN PATENTS 598,146  6/34  Germany.

JACOB L. NACKENOFF, *Primary Examiner.*

A. L. GOLDBERG, T. G. CRAVER, *Examiners.*